United States Patent
Prabhu et al.

(10) Patent No.: US 12,355,258 B2
(45) Date of Patent: Jul. 8, 2025

(54) RENEWABLE ENERGY POWERED THERMAL PROCESSING SYSTEM

(71) Applicant: Inductotherm Corp., Rancocas, NJ (US)

(72) Inventors: Satyen N. Prabhu, Voorhees, NJ (US); Adam J. Westerland, Hainesport, NJ (US); Bradley Winters, Port Matilda, PA (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 18/599,693

(22) Filed: Mar. 8, 2024

(65) Prior Publication Data

US 2024/0313547 A1 Sep. 19, 2024

Related U.S. Application Data

(60) Provisional application No. 63/451,671, filed on Mar. 13, 2023.

(51) Int. Cl.
*H02J 3/46* (2006.01)
*F27D 11/06* (2006.01)
(Continued)

(52) U.S. Cl.
CPC ............... *H02J 3/46* (2013.01); *F27D 11/06* (2013.01); *F27D 17/30* (2025.01); *H02J 3/001* (2020.01); *H02J 3/0075* (2020.01); *H02J 3/28* (2013.01); *F27B 3/08* (2013.01); *H02J 2300/26* (2020.01); *H02J 2300/28* (2020.01); *H02J 2300/40* (2020.01)

(58) Field of Classification Search
CPC .. H02J 3/001; H02J 3/0075; H02J 3/28; H02J 3/46; H02J 2300/26; H02J 2300/28; H02J 2300/40; F27D 17/30; F27D 11/06; F27B 3/08
USPC .......................................................... 307/65
See application file for complete search history.

(56) References Cited

U.S. PATENT DOCUMENTS

2012/0267952 A1   10/2012   Ballatine et al.
2015/0143806 A1   5/2015    Friesth
(Continued)

FOREIGN PATENT DOCUMENTS

CN      112787353 A      5/2021
WO      2021163769 A1    8/2021

*Primary Examiner* — Hal Kaplan
(74) *Attorney, Agent, or Firm* — Robert J. Everling

(57) ABSTRACT

A renewable energy powered thermal processing system is formed from a renewable energy source operably connected to an inverter via a charge controller. In one embodiment, a solar renewable energy source is operably connected to the inverter via a solar charge controller. The inverter is connected to a renewable energy storage device and further conditions the current for the thermal processing power supply, which then delivers energy to a thermal processing unit. A supplemental renewable energy source, such as wind, may further be operably connected to the inverter via a supplemental charge controller. As such, the thermal processing unit can be powered solely by renewable energy directly or stored renewable energy within the renewable energy storage device to provide a standalone, grid-independent renewable energy powered thermal processing system. Optionally, a grid tie may further selectively connect the system to an external power grid as a backup source of energy.

26 Claims, 5 Drawing Sheets

(51) Int. Cl.
    *F27D 17/30*     (2025.01)
    *H02J 3/00*     (2006.01)
    *H02J 3/28*     (2006.01)
    *F27B 3/08*     (2006.01)

(56) References Cited

U.S. PATENT DOCUMENTS

| | | |
|---|---|---|
| 2015/0144304 A1 | 5/2015 | Schneider et al. |
| 2021/0054290 A1 | 2/2021 | Schneider et al. |
| 2023/0018468 A1 | 1/2023 | Mordeglia |
| 2023/0062705 A1 | 3/2023 | Mordeglia et al. |

RENEWABLE ENERGY POWERED THERMAL PROCESSING SYSTEM

CROSS-REFERENCE TO RELATED APPLICATIONS

This application claims the benefit of U.S. Provisional Application No. 63/451,671, filed Mar. 13, 2023, hereby incorporated by reference in its entirety.

FIELD OF THE INVENTION

The present invention relates to renewable energy powered thermal processing systems.

BACKGROUND OF THE INVENTION

Transitioning to green (renewable) energy, such as solar power, hydroelectric power, wind power, or the like is becoming increasingly desirable, particularly in the commercial and industrial sectors. Renewable energy provides stark environmental benefits, particularly in the reduction of carbon emissions responsible for climate change. As a result, many governments are incentivizing the utilization of renewable energy sources via tax benefits, while adding restrictions to non-renewable energy source use. The finite availability of fossil fuels in combination with the governmental restrictions to non-renewable energy sources has led to increasing non-renewable energy costs across sectors. To reduce costs and benefit the environment, commercial and industrial entities are increasingly searching for opportunities to incorporate renewable energy into their processes.

In the foundry industry particularly, induction furnaces already represent a significant improvement in carbon emissions over alternative fossil fuel burning furnaces. Therefore, fully embracing renewable energy sources is the primary path to further reduce carbon emissions.

The constant evolution of improved efficiency in solar panels in combination with increased sizing of renewable energy storage systems ranging in sizes from ampere-hours to megaampere-hours makes the application of solar energy in commercial and industrial induction melting furnaces more feasible than ever before. However, there is still a significant challenge in integrating renewable energy applications into new commercial and industrial applications, such as induction melting furnaces.

For example, integration of renewable energy sources into existing electrical grids provides a slew of difficulties, typically impacting reliability of the grid. Solar energy is prone to inconsistent energy generation due to weather patterns and dust or other occlusions accumulating on the solar panel which produces an energy supply and demand mismatch. Similarly, wind power can also provide inconsistent energy. These power generation fluctuations lead to variations in grid strength which can cause steady state and transient voltage stability issues. As opposed to conventional electrical grids where active power balance is tied to frequency and reactive power balance is tied to voltage, renewable energy grid active and reactive power balance are both tied to voltage and frequency simultaneously. As a result, stability of the renewable energy grid can be negatively impacted, such as by frequency disturbances causing a voltage spike, leading to voltage sensitive loads tripping, and causing system collapse. Due to these risks, integration of grid-tied renewable energy sources into existing utility grids requires approval from the utility as well as following strict power regulations.

Furthermore, harmonic distortion in the power system as a result of fluctuating load currents of induction furnaces and other thermal processing units can also cause a significant decrease in power factor. Such distortion can be reflected into the electrical grid, causing reduced overall power quality or further instability in the grid. Additionally, harmonic distortion may also be present in the electrical grid introduced by other customers of the grid, such that power provided to any systems utilizing an electrical grid tie are initially operating at reduced power quality. Furthermore, induction furnaces and other equipment that draws a load current and pulsates asynchronously with the fundamental power system frequency generates inter-harmonics. As a result of these non-characteristic harmonics, grid-wide effects may be identified, such as flickering lights, which is further amplified by resonance within the system. Regulating harmonic distortions introduced into the grid often requires additional infrastructure or stringent limitations on power usage, such as filters, power factor correction capacitor banks, increasing the number of rectifier bridges in the power supply, reducing furnace size, or the like.

Additionally, infrastructure concerns exist for installing energy storage solutions and associated solar panels capable of generating sufficient energy to run commercial or industrial melting furnaces. Energy storage solutions are often expensive. Solar panels further require substantial surface area to generate sufficient energy, which may further be too heavy to be installed on an existing building's roof Wind turbines similarly have substantial infrastructure costs and space requirements.

Currently, some industrial utilization of renewable energy sources, such as solar, wind, and hydroelectric energy, is present, however, such incorporation of renewable energy sources is often limited in scope. For example, existing foundry systems may rely solely on solar energy purchased from and delivered by multiple third-party solar farms generating sufficient energy to satisfy 100% of the foundry's energy needs. Alternatively, solar energy is used in industrial applications as a form of supplemental energy capable of offsetting conventional energy consumption by substantial percentages. However, such solutions fail to provide a closed system capable of providing 100% of the furnace's energy requirements on-site, with minimal losses, and capable of being isolated from existing power grids.

One object of the present invention is to provide a renewable energy powered thermal processing system and a method of thermal processing with renewable energy backed-up by stored renewable energy or grid supplied alternating current.

Another object of the present invention is to provide a renewable energy powered thermal processing system and a method of thermal processing with renewable energy backed-up by stored renewable energy independent of an external electrical grid.

BRIEF SUMMARY OF THE INVENTION

In one aspect the present invention is a thermal processing system utilizing renewable energy.

In another aspect the present invention is a method of thermal processing with renewable energy supported by backup energy sources including stored renewable energy and optionally grid supplied alternating current.

The above and other aspects of the present invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this disclosure.

DETAILED DESCRIPTION OF THE PRESENT INVENTION

Figure 1A:
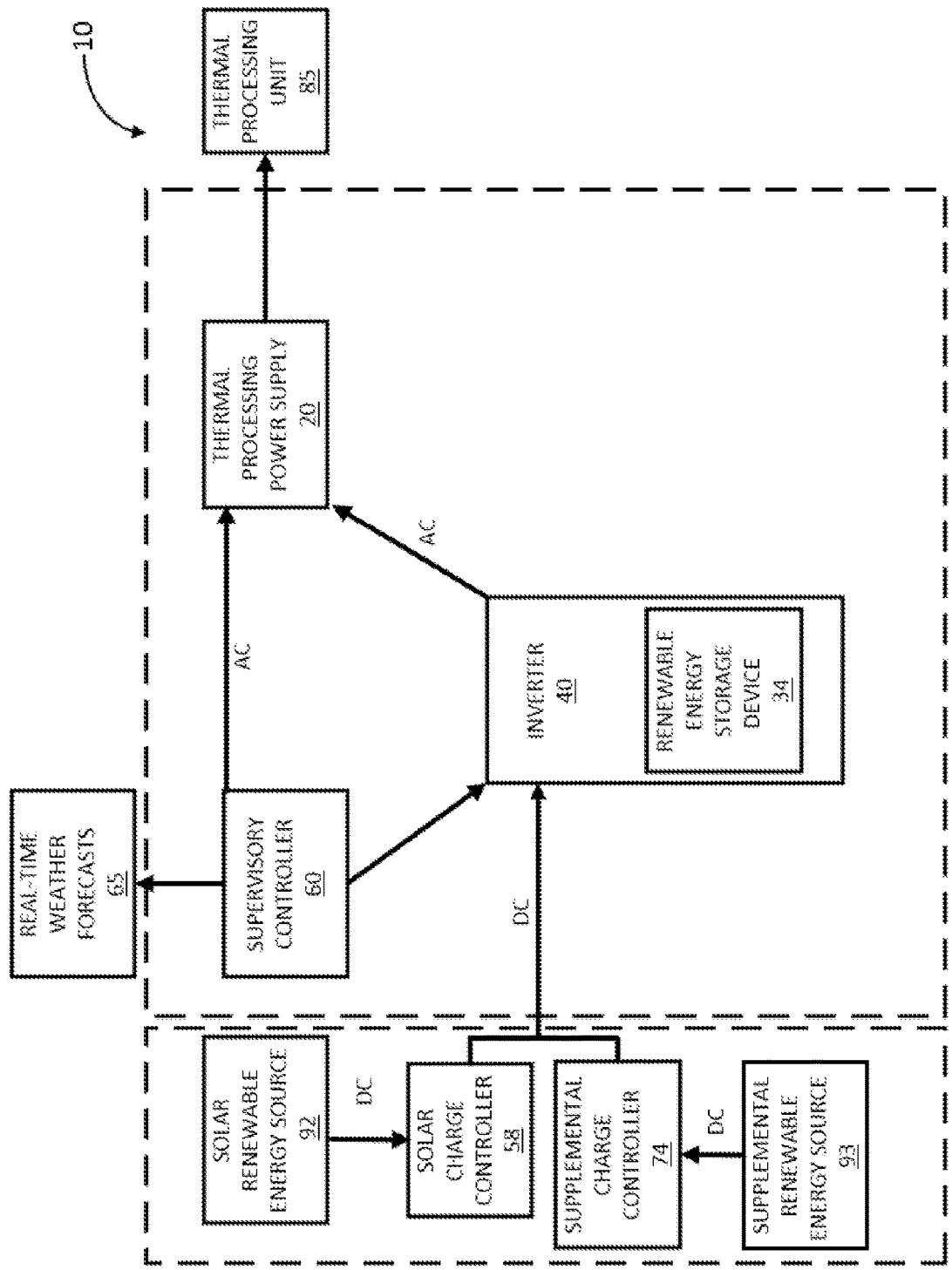
FIG. 1(a) illustrates one example of an independent off-grid renewable energy powered thermal processing system of the present invention.

There is shown in FIG. 1(a) one example of a renewable energy powered thermal processing system 10 of the present invention.

For the purposes of illustration, the renewable energy powered thermal processing system 10 is shown and described as primarily comprising a solar renewable energy source 92 (primary renewable energy source) with one or more optional supplemental renewable energy sources 93 in combination with solar renewable energy source 92, however, it should be understood by one having skill in the art that solar renewable energy source 92 may be interchangeable with any alternate renewable energy source. In such embodiments, one or more discrete renewable energy sources, such as solar, wind, hydroelectric, or any other renewable energy source may be utilized in any combination to provide power to a thermal processing unit as further described below.

Figure 1B:
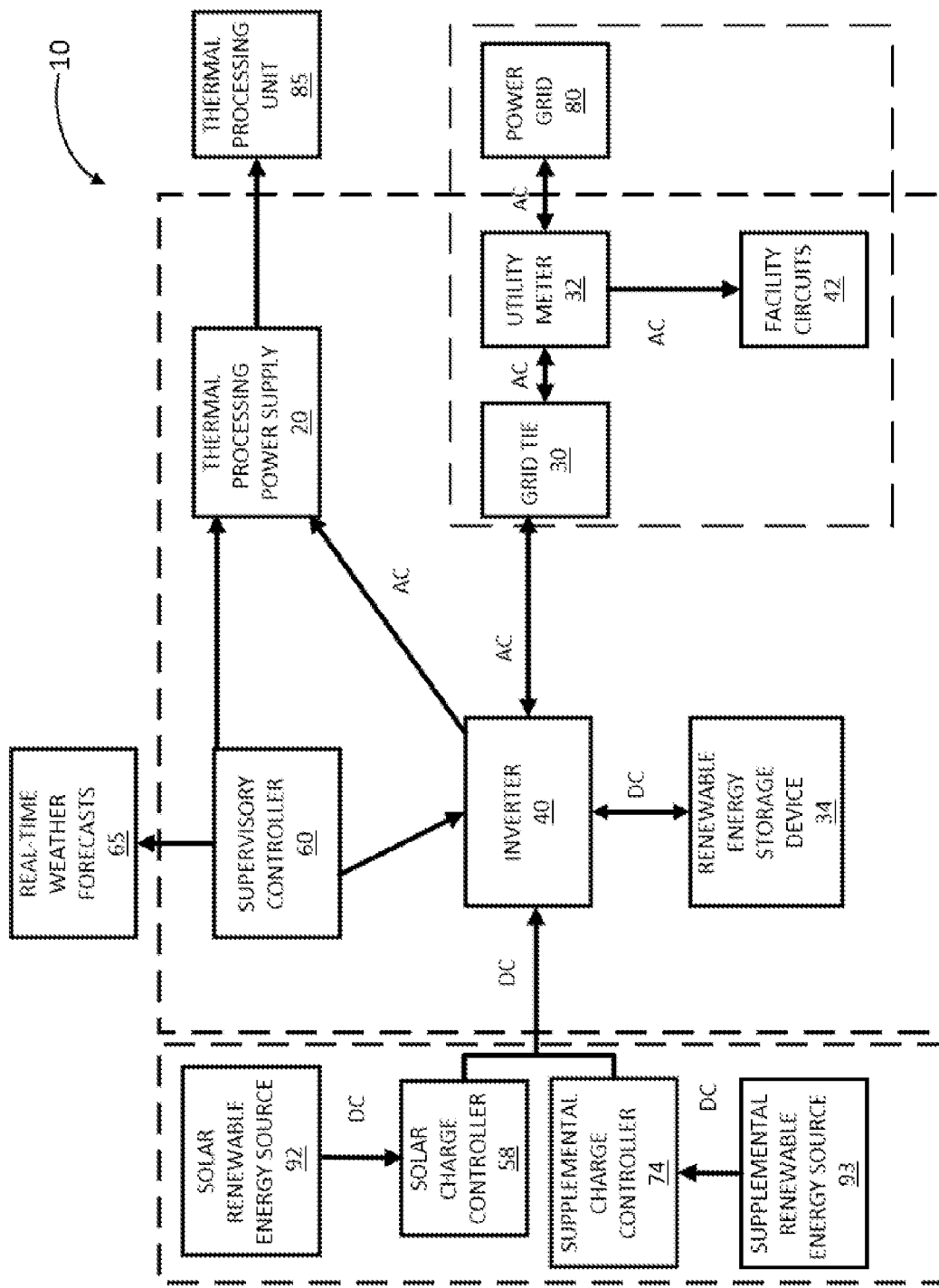
FIG. 1(b) illustrates one example of a renewable energy powered thermal processing system of the present invention utilizing an external electrical grid backup.

In the illustrated embodiment of FIG. 1(a), the renewable energy powered thermal processing system 10 comprises a renewable energy generation section including an external renewable energy generating system having a solar renewable energy source 92 with input to solar charge controller 58 (primary charge controller). Solar renewable energy source 92 is a suitable source of DC solar power, such as an array of solar panels. Solar panels can comprise roof mounted panels, field mounted panels, façade mounted panels, or a combination thereof to suit the available installation area. The output of solar renewable energy source 92 is connected to inverter 40 through the solar charge controller 58. In the embodiment of FIG. 1(b), a power grid 80 is operably connected to the renewable energy powered thermal processing system 10 to supplement renewable energy production and to enable sale of excess renewable energy production to the power grid 80 utility. However, an independent and off-grid embodiment of the renewable energy powered thermal processing system 10 is also contemplated and provides alternative benefits over the power grid 80 connected embodiment as elsewhere described herein.

Renewable energy storage device 34 is operably connected to inverter 40 and is configured to store excess energy generated by the solar renewable energy source 92, such that the stored renewable energy can be utilized to provide sufficient power to the renewable energy powered thermal processing system 10 to operate when the solar renewable energy source 92 alone produces insufficient energy to power the renewable energy powered thermal processing system 10. As such, renewable energy storage device 34 compensates for transient reduced energy production by the solar renewable energy source 92 due to external factors such as weather conditions. Renewable energy storage device 34 is contemplated to include a plurality of batteries operably connected in parallel or any other suitable energy storage device. Renewable energy storage device 34 outputs DC. To account for power availability fluctuations from solar renewable energy source 92, solar charge controller 58 utilizes maximum power point tracking (MPPT) to optimize power availability from the solar renewable energy source 92 across varied environmental conditions. The solar charge controller 58 monitors outputs from the solar renewable energy source 92 and adjusts an impedance presented to the solar renewable energy source 92 to match a load impedance, in this case, the impedance of the inverter 40, to maintain optimal power transfer efficiency to loads connected to the inverter 40 such as a thermal processing unit 85 and the renewable energy storage device 34.

In the illustrated embodiment, the renewable energy generation section of the renewable energy powered thermal processing system 10 further comprises supplemental renewable energy source 93. The supplemental renewable energy source 93 is contemplated to comprise additional renewable energy sources other than solar, such as, but not limited to, wind, hydroelectric energy, or other renewable energy sources or combinations thereof. Supplemental renewable energy source 93 is further connected to inverter 40 via supplemental charge controller 74, which is in turn connected to renewable energy storage device 34 such that excess energy generated by supplemental renewable energy source 93 is stored within renewable energy storage device 34. Supplemental charge controller 74 comprises an MPPT charge controller to optimize power availability from the supplemental renewable energy source 93 to account for variations in renewable energy availability, such as fluctuating wind conditions, as previously discussed relative to the solar renewable energy source 92.

Inverter 40 can comprise an intelligent hybrid inverter having a control logic installed thereon capable of selecting between direct use of energy from each of the solar renewable energy source 92, the supplemental renewable energy source 93, the renewable energy storage device 34 (collectively the renewable energy sources), and, in grid-connected embodiments, the power grid 80 to efficiently manage energy usage and consumption. The inverter 40 can further simultaneously draw from multiple sources to meet energy demands. For example, the inverter 40 may select to draw from both the solar renewable energy source 92 and the renewable energy storage device 34 to meet current energy demands, while refraining from connecting to the power grid 80 unless the solar renewable energy source 92 and the renewable energy storage device 34 are insufficient to meet the current energy demands. In some embodiments, the control logic of the inverter 40 is configured to select one or more energy sources to meet the current energy demands following a priority list, which comprises in order from most preferred energy source to least preferred energy source: solar renewable energy source 92, supplemental renewable energy source 93, renewable energy storage device 34, and power grid 80. Alternatively, the inverter 40 may prioritize renewable energy sources during periods of peak power grid 80 usage, such that energy costs in drawing from the power grid 80 can be minimized. The inverter 40 control logic is further configured to dynamically monitor energy demand of the renewable energy powered thermal processing system 10. In some embodiments, such as the embodiment illustrated in FIG. 1(b), inverter 40 is integral with the renewable energy storage device 34.

Figure 2A:
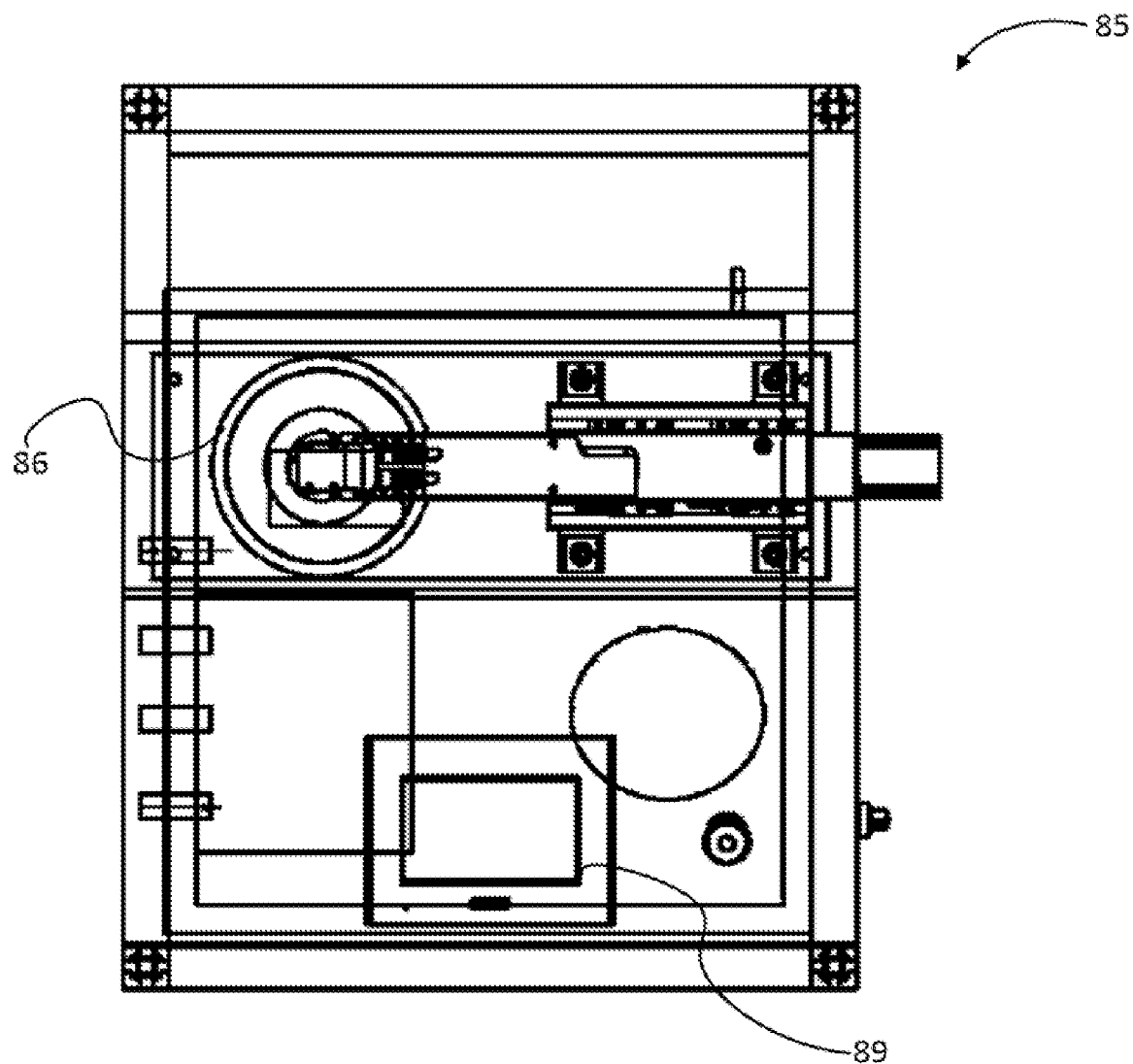
FIG. 2(a) illustrates a top plan view of an example of a thermal processing unit of the present invention.
Figure 2B:
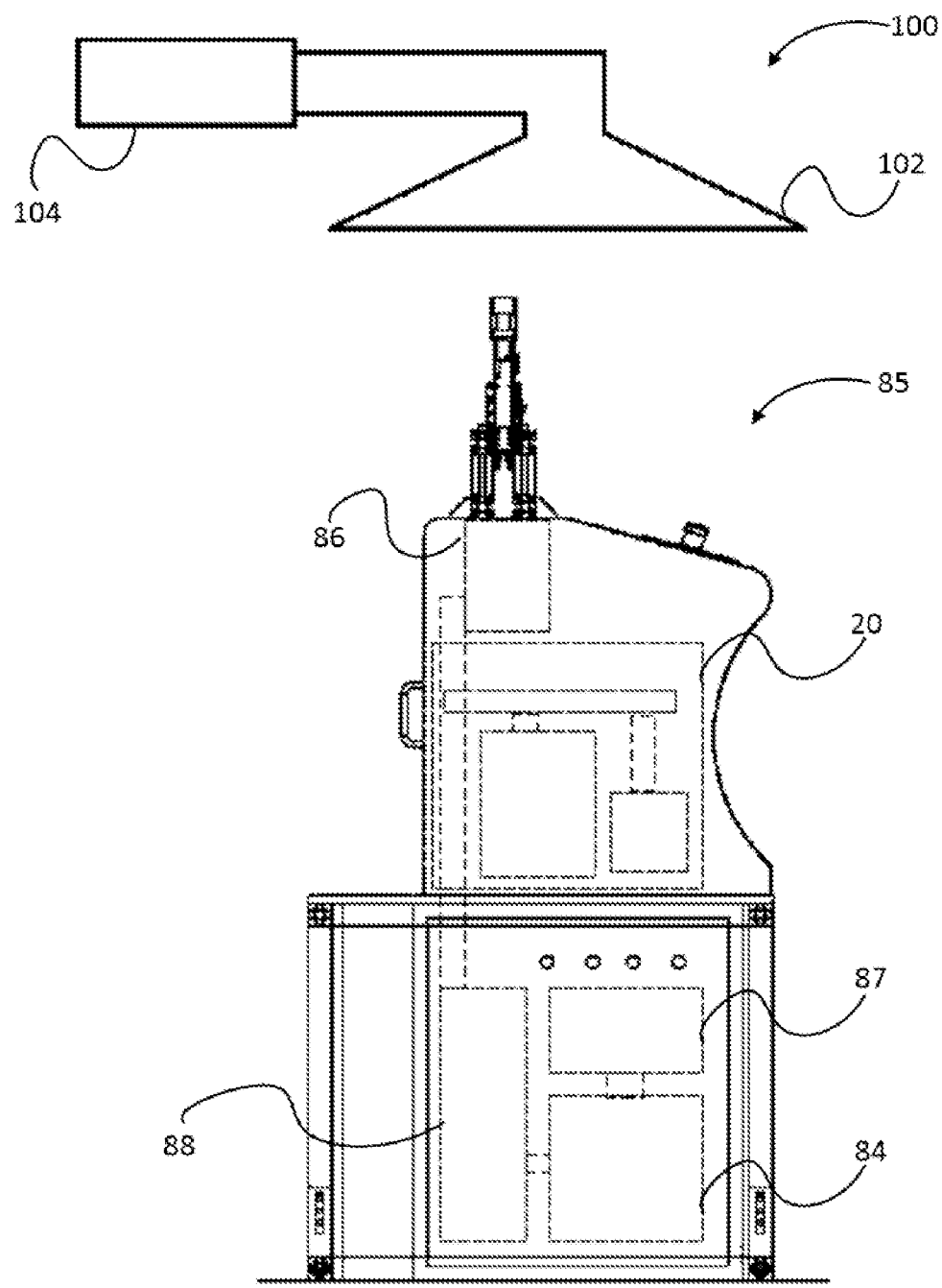
FIG. 2(b) illustrates a left-side plan view of the thermal processing unit of FIG. 2(a).
Figure 2C:
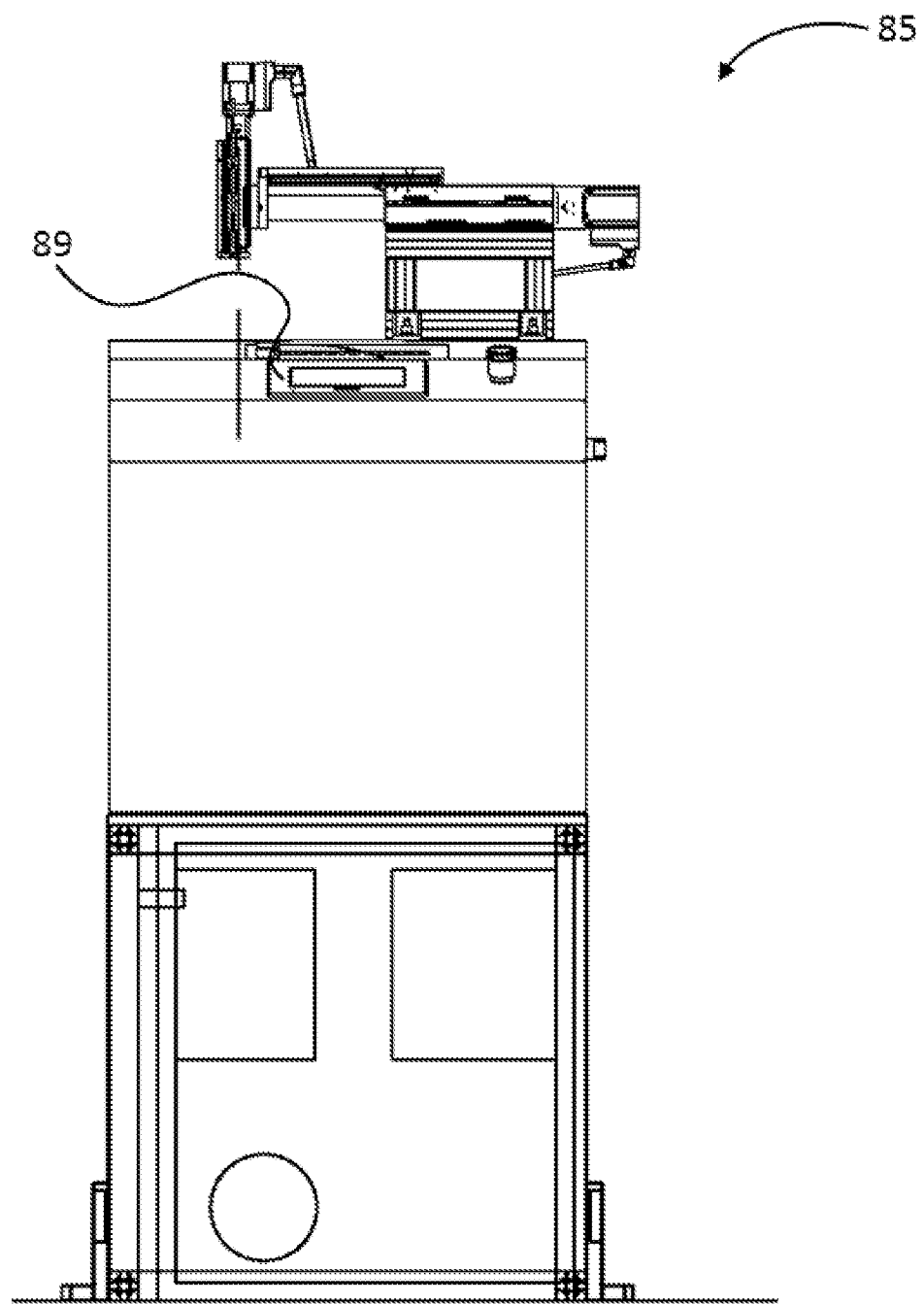
FIG. 2(c) illustrates a front plan view of the thermal processing unit of FIG. 2(a).

Furthermore, in one embodiment, the inverter 40 may pair with a human machine interface (HMI) device to deliver operational information including power availability, breakdowns of power consumption across the various energy sources over time, or the like. In the illustrated embodiments of FIGS. 2(a), 2(b), and 2(c), the HMI 89 is disposed on the thermal processing unit 85, however, the HMI may additionally be located on the inverter 40 or an external console. In some embodiments, the human machine interface further provides operations controls configured to allow a user to scale energy demands relative to currently available power from one or more renewable energy sources. For example, in such an embodiment, if the inverter 40 detects that reduced energy is being produced by the solar renewable energy source 92 or the supplemental renewable energy source 93, such that additional energy is being drawn from the renewable energy storage device 34 or the power grid 80, energy demand from a downstream thermal processing unit 85 is reduced to conserve energy. The scaling feature can be enabled via the human machine interface and can provide substantial benefits in both power grid 80 connected embodiments of the present invention in the form of reduced energy costs, and power grid 80 independent embodiments of the present invention in the form of continuous productivity, albeit at reduced efficiency as energy demands fluctuate.

In some applications, a supervisory controller 60 is operably connected to the inverter 40 is configured to access real-time weather forecasts 65 via wireless network communications methodologies, such as cellular networks, wherein the real-time weather forecasts 65 are utilized to preemptively prepare scheduling guidance for future power source transitions when renewable energy availability is expected to fluctuate from a baseline energy generation rate. For example, when weather conducive to increased renewable energy generation is forecasted, the supervisory controller 60 may suggest the user schedule additional operation of the downstream thermal processing unit 85 to deplete the renewable energy storage device 34 in preparation for the period of more beneficial weather, such as increased sun or wind, during which it is expected excess energy is likely to be generated and stored within the renewable energy storage device 34. Inversely, when poor weather conditions are forecasted, the supervisory controller 60 may provide scheduling recommendations to conserve energy stored within the renewable energy storage device 34 by suggesting reduced operation of the downstream thermal processing unit 85, such that a greater supply of stored energy is available for use when solar renewable energy source 92 or the supplemental renewable energy sources 93 are expected to be less productive. While in the previously discussed embodiments, the supervisory controller 60 passively provides scheduling guidance based upon real-time weather forecasts 65 which must be independently implemented by a user, in some embodiments, the supervisory controller 60 may actively adjust current energy usage in association with the suggested scheduling guidance. In such embodiments, user implementation of weather specific scheduling is not required.

In a preferred embodiment, as best illustrated by FIG. 1(a), the renewable energy powered thermal processing system 10 comprises an independent and off-grid configuration, such that the thermal processing unit 85 is powered solely via renewable energy received by the solar renewable energy source 92 and optionally the one or more supplemental renewable energy sources 93. In this manner, the renewable energy powered thermal processing system 10 operates as a self-contained, standalone thermal processing system independent of external power grids. In such embodiments, the inverter 40 monitors the power stored in the energy storage device 34, and upon detection of the power falling below a deactivation threshold level, the thermal processing power supply 20 is deactivated. Once the power stored in the renewable energy storage device 34 exceeds an activation threshold level, the thermal processing power supply 20 is activated. The deactivation and activation threshold levels may be adjusted by a user via controls input to the HMI to account for variable operational preferences. Alternatively, the inverter 40 monitors the rate of energy consumption from the energy storage device 34 relative to the rate of energy generation from the solar renewable energy source 92 and any supplemental renewable energy sources 93. In such embodiments, once the rate of energy consumption exceeds the rate of energy generation, the thermal processing power supply 20 is deactivated. A combination of energy monitoring methodologies may also be utilized. For example, the thermal processing power supply 20 may be deactivated if the rate of energy consumption exceeds the rate of energy generation once the energy stored in the energy storage device 34 falls below the deactivation threshold level, and reactivated upon the rate of energy generation exceeding the rate of energy consumption and the energy stored in the energy storage device 34 exceeds one of the deactivation threshold level or the activation threshold level.

Furthermore, as discussed above, control software installed on the inverter 40 may further provide a scaling algorithm, in which energy demand from the thermal processing unit 85 is reduced to accommodate reduced renewable energy production to avoid periods of inoperability due to deactivation. In such embodiments, energy demand may be reduced upon detection of the power stored in the renewable energy storage device 34 approaching the deactivation threshold level. For example, should total available energy within the renewable energy storage device 34 approach within a range of 5-15% above the deactivation threshold level, the scaling algorithm may be activated to dynamically reduce the energy demand of the thermal processing unit 85 in association with the rate of energy generation to maintain a constant power level stored in the renewable energy storage device 34. Once the rate of energy generation is sufficient to overcome an initial energy demand prior to the scaling algorithm's activation (full energy demand), the scaling algorithm can be deactivated and energy generated in excess of the energy demand can be stored in the renewable energy storage device 34 as during normal operation.

In the off-grid embodiment, the renewable energy powered thermal processing system 10 is not constrained to external power grid 80 limitations, such as limitations on harmonic distortion, and as a result can operate without additional filtering or other equipment or infrastructure considerations required to adhere to power quality standards required by the external power grid 80. For example, consistent operation of the renewable energy powered thermal processing system 10 can be achieved so long as a combination of energy generation by the solar renewable energy source 92 and any additional supplemental renewable energy sources 93 and any stored energy within the renewable energy storage device 34 is sufficient to maintain consistent operation. In the alternative, a grid-tied system may be subject to special operating procedures, such as limitations to operate at off-peak hours so as not to inject instability into the external power grid 80 when a majority of other customers are utilizing the external power grid 80.

In the illustrated embodiment of FIG. 1(*b*), external power grid 80 is optionally connected to the inverter 40 through utility meter 32 and grid tie 30. Power grid 80 provides power to existing facility circuits 42 while serving as an auxiliary energy source for the renewable energy thermal processing system 10. In some embodiments, the power grid 80 is operably connected to the inverter 40 and associated renewable energy storage device 34, such that energy from the power grid 80 can flow to the renewable energy storage device 34. In this manner, the power grid 80 may be used to charge the renewable energy storage device 34 in periods of low renewable energy availability. Grid tie 30 is configured to control system operation and detect power grid 80 outages. Upon power grid 80 outage, grid tie 30 actuates a backup switch, disconnecting the system from the power grid 80 and isolating the system such that the solar renewable energy source 92, supplemental renewable energy source 93, and the renewable energy storage device 34 provide all requisite power. Similarly, when insufficient energy is delivered by the solar renewable energy source 92, supplemental renewable energy source 93, and the renewable energy storage device 34, grid tie 30 operably connects external power grid 80 to the inverter 40. Backup switch operation ensures continuous properly conditioned power is available to inverter 40 to prevent faults. In some embodiments, the backup switch comprises a manual toggle rather than an internal switch actuated within the grid tie 30 upon detection of lacking power availability. Furthermore, in some embodiments, the external power grid 80 is bidirectional, such that when the renewable energy storage device 34 is at capacity and excess energy is generated by the solar renewable energy source 92 and the supplemental renewable energy source 93, the excess energy can be directed to the external power grid 80 via grid tie 30. In this manner, excess energy generated by the renewable energy powered thermal processing system 10 can be sold to the utility.

Thermal processing power supply 20 receives AC from inverter 40 delivered by one or more of external power grid 80, solar renewable energy source 92, supplemental renewable energy source 93, or renewable energy storage device 34 as conditions allow. Thermal processing power supply 20 further conditions the AC received from inverter 40 for compatibility with the thermal processing unit 85. As best seen illustrated in FIG. 2(*b*), in some embodiments, the thermal processing power supply 20 is integral with the thermal processing unit 85. In one example, thermal processing unit 85 comprises a 5 kW commercial induction furnace configured for use with readily available single phase power supplies.

As illustrated in FIGS. 2(*a*), 2(*b*), and 2(*c*), the thermal processing unit 85 can further comprise a self-contained closed-loop fluid-cooled system with an integrated chiller apparatus 88 to maintain the internal components, such as an induction coil, at a desired operating temperature. Cooling fluid is driven through the self-contained closed-loop cooling system via pump 84, is cooled by integrated chiller apparatus 88, and transfers heat from various internal components in the thermal processing unit 85 and the thermal processing power supply 20, including from the induction coil surrounding crucible 86. In some embodiments, fluid reserve 87 retains excess cooling fluid and provides space for expansion and overflow as the cooling fluid heats. In such embodiments, external fluid-cooling connections, such as to existing plumbing systems, are not required.

In the illustrated embodiments, an exhaust system 100 is in communication with the thermal processing unit 85, wherein the exhaust system 100 captures and redirects fumes created during thermal processing. In the shown embodiment, the exhaust system 100 comprises a fume hood 102 offset above the crucible 86 of the thermal processing unit 85, wherein the fume hood 102 includes a fan or pump to drive air from the thermal processing unit 85 to an external exhaust. The exhaust system 100 may further be configured to filter or otherwise treat the fumes to an environmentally acceptable standard. As illustrated, the exhaust system 100 includes an in-line filtration system 104 downstream of the fume hood 102. Filtration system 104 can comprise one or a combination of HEPA filters, activated carbon filters, and specialty blended filtration media, such as acid gas, mercury, aldehyde, and ammonia.

In operation, solar renewable energy source 92 provides solar energy to the inverter 40, wherein energy in excess of the total energy demand of the renewable energy powered thermal processing system 10 is stored in one or more renewable energy storage devices 34. Energy from each of the solar renewable energy source 92 and the one or more renewable energy storage devices 34 corresponding to the total energy demand is then converted to AC and conditioned by inverter 40. Optionally, supplemental renewable energy source 93 provides additional renewable energy to the inverter 40 and the one or more renewable energy storage devices 34, such as generated via wind turbine as discussed elsewhere herein. Thermal processing unit 85 is installed and connected to inverter 40 through thermal processing power supply 20 to ensure proper voltage and frequency requirements by the thermal processing unit 85 are met. If renewable energy storage device 34, solar renewable energy source 92, and supplemental renewable energy source 93, are incapable of meeting the power demands of the thermal processing unit 85, in some embodiments, grid tie 30 will connect external power grid 80 to inverter 40 to ensure continuous energy is received by thermal processing unit 85 to prevent electrical fault. In such embodiments, the external power grid 80 may further be utilized to provide energy to the one or more renewable energy storage devices 34, particularly when renewable energy production is significantly reduced. Alternatively, when insufficient energy is being produced by the solar renewable energy source 92, the supplement renewable energy source 93, and the renewable energy storage device 34 to meet the total energy demand, the thermal processing power supply may be deactivated, or optionally scale energy demand to match the available energy production as previously discussed herein. In this manner, renewable energy powered thermal processing system 10 operates primarily or solely via renewable energy sources to reduce carbon emissions compared to primarily grid-powered systems.

For sufficiently low kW applications, where "low" is defined as below a maximum of 5 kW, such as some commercial induction melting furnace systems or those for testing and demonstration purposes, the renewable energy powered thermal processing system 10 can operate solely with single phase power and suitable components. For larger installations, three phase power and suitable components are utilized. In some embodiments, three phase inverters are optionally included in addition to single phase inverters to accommodate either application.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A renewable energy powered thermal processing system, comprising:
    one or more renewable energy sources, wherein the one or more renewable energy sources are selected from a group consisting of: solar energy, wind energy, and hydroelectric energy;
    wherein the one or more renewable energy sources comprise an exclusive source of energy for the renewable energy powered thermal processing system, such that the renewable energy powered thermal processing system comprises a self-sustained thermal processing system independent of an external power grid;
    wherein the one or more renewable energy sources are each operably connected to a corresponding charge controller, the charge controller operably connected to an inverter and configured to execute a maximum power point tracking algorithm comprising:
        monitoring a direct current output of the one or more renewable energy sources;
        adjusting an impedance presented to the one or more renewable energy sources to match a load impedance;
        wherein the load impedance comprises an impedance relative to a thermal processing load;
    wherein the inverter is operably connected to one or more renewable energy storage devices and the one or more charge controllers, the inverter receiving a controller direct current output from the one or more charge controllers and a storage direct current output from the one or more renewable energy storage devices and inverting the controller direct current output and the storage direct current output into a combined alternating current output;
    a thermal processing power supply operably connected to the inverter and configured to receive the combined alternating current output and regulate the combined alternating current output for compatibility with a thermal processing unit; and
    wherein the thermal processing unit is operably connected to the thermal processing power supply, wherein the thermal processing unit comprises a crucible that receives a material charge to be melted.

2. The renewable energy powered thermal processing system of claim 1, wherein the inverter further comprises a control logic configured to selectively draw power from the one or more renewable energy sources and the one or more renewable energy storage devices prioritizing the one or more renewable energy sources over the one or more renewable energy storage devices.

3. The renewable energy powered thermal processing system of claim 1, further comprising a supervisory controller operably connected to the inverter, wherein the supervisory controller monitors weather forecasts and generates processing schedules to be activated via a human machine interface, wherein the generated processing schedule suggests extended operation of the thermal processing unit when the weather forecasts indicate weather expected to result in an increase in energy generation by the one or more renewable energy sources over a baseline energy generation rate and further suggests reduced operation of the thermal processing unit when the weather forecasts indicate weather expected to result in a decrease in energy generation by the one or more renewable energy sources relative to the baseline energy generation rate.

4. The renewable energy powered thermal processing system of claim 1, wherein the thermal processing unit comprises a 5 kW induction furnace having an integrated independent closed-loop cooling system.

5. The renewable energy powered thermal processing system of claim 1, further comprising an exhaust system comprising a fume hood disposed above the crucible of the thermal processing unit and a filtration system, wherein the exhaust system is configured to collect, redirect, and filter fumes created as the material charge is melted.

6. A renewable energy powered thermal processing system, comprising:
    a renewable energy generation section, comprising:
        one or more primary renewable energy sources, each operably connected to a primary charge controller;
        wherein each primary charge controller implements a maximum power point tracking algorithm configured to monitor a direct current output from the one or more primary renewable energy sources and adjust an impedance presented to the one or more primary renewable energy sources to match a load impedance of an inverter;
    the inverter operably connected to each of the primary charge controllers, the inverter receiving a secondary direct current output of the primary charge controllers and transforming the secondary direct current output into an alternating current output;
    one or more renewable energy storage devices operably connected to the inverter, wherein the one or more renewable energy storage devices store energy in excess of an energy demand of the renewable energy powered thermal processing system;
    a thermal processing power supply operably connected to the inverter, the thermal processing power supply configured to receive the alternating current output and regulate the alternating current output for compatibility with a thermal processing unit; and
    wherein the thermal processing unit is operably connected to the thermal processing power supply, and further comprises a crucible that receives a material charge to be melted.

7. The renewable energy powered thermal processing system of claim 6, further comprising an external power grid operably connected to the inverter via a grid tie, wherein the grid tie further comprises a switch configured to selectively connect and disconnect the external power grid to the inverter.

8. The renewable energy powered thermal processing system of claim 7, wherein the grid tie monitors a status of the external power grid and selectively actuates the switch to isolate the renewable energy powered thermal processing system from the external power grid when an outage of the external power grid is detected.

9. The renewable energy powered thermal processing system of claim 7, wherein the inverter further comprises a control logic configured to selectively draw power from the renewable energy generation section, the one or more renewable energy storage devices, and the external power grid prioritizing the renewable energy generation section over the one or more renewable energy storage devices and the one or more renewable energy storage devices over the external power grid.

10. The renewable energy powered thermal processing system of claim 6, wherein the one or more renewable energy storage devices are integral with the inverter.

11. The renewable energy powered thermal processing system of claim 6, wherein the one or more primary renewable energy sources are selected from a group consisting of: solar energy, wind energy, and hydroelectric energy.

12. The renewable energy powered thermal processing system of claim 6, wherein the inverter further comprises a control logic configured to selectively draw power from the renewable energy generation section and the one or more renewable energy storage devices prioritizing the renewable energy generation section over the one or more energy storage devices.

13. The renewable energy powered thermal processing system of claim 6, wherein a supervisory controller is operably connected to the inverter, wherein the supervisory controller monitors weather forecasts and generates processing schedules to be activated via a human machine interface, wherein the each generated processing schedule suggests extended operation of the thermal processing unit when the weather forecasts indicate weather expected to result in an increase in energy generation by the renewable energy generation section over a baseline energy generation rate and further suggests reduced operation of the thermal processing unit when the weather forecasts indicate weather expected to result in a decrease in energy generation by the renewable energy generation section relative to the baseline energy generation rate.

14. The renewable energy powered thermal processing system of claim 6, wherein the renewable energy generation section further comprises:
one or more supplemental renewable energy sources, each operably connected to a supplemental charge controller;
wherein each supplemental charge controller implements a maximum power point tracking algorithm configured to monitor a direct current output from the one or more supplemental renewable energy sources and adjust an impedance presented to the one or more supplemental renewable energy sources to match a load impedance of the inverter;
wherein the inverter is operably connected to each supplemental charge controller, the inverter receiving a supplemental direct current output from each supplemental charge controller and converting the supplement direct current output into the alternating current output in combination with the secondary direct current output.

15. The renewable energy powered thermal processing system of claim 14, wherein the one or more supplemental renewable energy sources are selected from a group consisting of: solar energy, wind energy, and hydroelectric energy.

16. The renewable energy powered thermal processing system of claim 6, wherein the thermal processing unit comprises a 5 kW induction furnace having an integrated independent closed-loop cooling system.

17. The renewable energy powered thermal processing system of claim 6, further comprising an exhaust system comprising a fume hood disposed above the crucible of the thermal processing unit and a filtration system, wherein the exhaust system is configured to collect, redirect, and filter fumes created as the material charge is melted.

18. A method of providing renewable energy to a thermal processing system, comprising:
gathering energy from one or more renewable energy sources, wherein the one or more renewable energy sources are selected from a group consisting of: solar energy, wind energy, and hydroelectric energy;
optimizing energy collection efficiency via a maximum power point tracking algorithm installed on one or more charge controllers operably connected to each of the one or more renewable energy sources, the maximum power point tracking algorithm comprising the steps of:
monitoring a source direct current output of the one or more renewable energy sources;
adjusting an impedance presented to the one or more renewable energy sources to match a load impedance;
wherein the load impedance is an impedance relative to a thermal processing load;
determining an energy demand for the thermal processing system;
storing energy produced by the one or more renewable energy sources in excess of the energy demand in one or more renewable energy storage devices;
inverting a controller direct current output of the one or more charge controllers and a storage direct current output from the one or more energy storage devices corresponding to the energy demand to a combined alternating current output via an inverter operably connected to the one or more charge controllers and the one or more energy storage devices;
wherein the storage direct current output is variably supplied to the inverter to meet the energy demand;
providing the alternating current output to the thermal processing unit via the thermal processing power supply; and
melting a material charge disposed within a crucible of the thermal processing unit.

19. The method of claim 18, further comprising removing and filtering fumes produced as a result of the melting step via an exhaust system, wherein the exhaust system includes a fume hood disposed over the crucible and a filtration system.

20. The method of claim 18, further comprising the steps of:
monitoring a power level produced by the one or more renewable energy sources via a control logic installed on the inverter;
monitoring a stored power level disposed within the one or more renewable energy storage devices;
selectively connecting an external power grid to the inverter via a grid tie upon the inverter detecting a power level and a stored power level below a minimum energy availability threshold corresponding to the energy demand.

21. The method of claim 18, further comprising cooling the thermal processing unit via an integrated independent closed-loop cooling system disposed within the thermal processing unit.

22. The method of claim 18, further comprising the steps of:
monitoring a stored power level disposed within the one or more energy storage devices via a control logic installed on the inverter;

deactivating the thermal processing power supply upon detection of the stored power level falling below a deactivation threshold level; and reactivating the thermal processing power supply upon detection of the stored power level exceeding an activation threshold level.

23. The method of claim 18, further comprising the steps of:

monitoring a rate of energy generation of the one or more renewable energy sources and a rate of consumption of the one or more renewable energy storage devices via a control logic installed on the inverter;

deactivating the thermal processing power supply upon detection of the rate of energy generation falling below the rate of consumption; and reactivating the thermal processing power supply upon detection of the rate of energy generation exceeding the rate of consumption.

24. The method of claim 18, further comprising the steps of:

monitoring a rate of energy generation of the one or more renewable energy sources and a rate of consumption of the one or more renewable energy storage devices via a control logic installed on the inverter;

deactivating the thermal processing power supply upon detection of the rate of energy generation falling below the rate of consumption;

monitoring a stored power level disposed within the one or more energy storage devices via the control logic installed on the inverter;

reactivating the thermal processing power supply upon detection of:

the rate of energy generation exceeding the rate of consumption; and the stored power level exceeding an activation threshold level.

25. The method of claim 18, further comprising the steps of:

monitoring a rate of energy generation of the one or more renewable energy sources and the energy demand of the thermal processing system via a control logic installed on the inverter;

monitoring a stored power level disposed within the one or more renewable energy storage devices via the control logic installed on the inverter;

activating a scaling algorithm installed on the control logic when a stored power level within the one or more renewable energy storage devices approaches a deactivation threshold level;

wherein the scaling algorithm comprises:

adjusting the energy demand dynamically to match the rate of energy generation via modulating power provided to the thermal processing unit when a stored power level within the one or more renewable energy storage devices approaches the deactivation threshold level;

deactivating the scaling algorithm when the rate of energy generation exceeds an initial energy demand, the initial energy demand comprising the energy demand prior to activating the scaling algorithm.

26. The method of claim 25, wherein the scaling algorithm is activated when the stored power level reaches between 5-15% above the deactivation threshold level.

* * * * *